(12) United States Patent
Skärby et al.

(10) Patent No.: US 10,088,552 B2
(45) Date of Patent: Oct. 2, 2018

(54) DETERMINING POSITION OF A WIRELESS DEVICE USING REMOTE RADIO HEADS AND SIGNAL QUALITIES

(71) Applicant: TELEFONAKTIEBOLAGET LM ERICSSON (PUBL), Stockholm (SE)

(72) Inventors: Ulf Skärby, Lidingö (SE); Fredrik Ovesjö, Älvsjö (SE); Christian Skärby, Stockholm (SE); Leonard Lightstone, Ottawa (CA); Stéphane Tessier, I, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/740,478

(22) PCT Filed: Jun. 28, 2015

(86) PCT No.: PCT/SE2015/050755
§ 371 (c)(1),
(2) Date: Dec. 28, 2017

(87) PCT Pub. No.: WO2017/003325
PCT Pub. Date: Jan. 5, 2017

(65) Prior Publication Data
US 2018/0188350 A1    Jul. 5, 2018

(51) Int. Cl.
*G01S 5/14*    (2006.01)
*G01S 11/06*   (2006.01)
(Continued)

(52) U.S. Cl.
CPC .............. *G01S 5/14* (2013.01); *G01S 5/0036* (2013.01); *G01S 11/06* (2013.01); *H04W 4/33* (2018.02); *H04W 64/003* (2013.01)

(58) Field of Classification Search
CPC . H04W 72/0413; H04W 64/00; H04W 4/025; H04W 16/28; H04W 64/003;
(Continued)

(56) References Cited

U.S. PATENT DOCUMENTS

| 2011/0190005 A1 | 8/2011 | Cheon et al. |
| 2012/0039320 A1* | 2/2012 | Lemson ................ H03F 1/3247 370/338 |

(Continued)

FOREIGN PATENT DOCUMENTS

| EP | 1448008 A1 | 8/2004 |
| WO | 2015/156714 A1 | 10/2015 |
| WO | 2015/193704 A1 | 12/2015 |

*Primary Examiner* — Daniel Lai

(57) ABSTRACT

It is presented a method for determining a position of a wireless device, the method being performed in a network node connected to a plurality of remote radio heads via a combiner. The method comprises the steps of: adjusting a weighting of an uplink signal for at least one of the remote radio heads; measuring a signal quality of a combined uplink signal received via the combiner; repeating the steps of adjusting and measuring until an exit condition is true; and determining a position of the wireless device based on how the measured signal quality differs for adjustments of weighting of the uplink signal for different remote radio heads.

20 Claims, 4 Drawing Sheets

(51) Int. Cl.
*G01S 5/00* (2006.01)
*H04W 4/33* (2018.01)
*H04W 64/00* (2009.01)

(58) Field of Classification Search
CPC .......... H04W 4/33; G01S 5/14; G01S 5/0036; G01S 11/06
See application file for complete search history.

(56) References Cited

U.S. PATENT DOCUMENTS

2014/0146782 A1* 5/2014 Gerlach ............ H04W 72/0426
370/329
2015/0296344 A1* 10/2015 Trojer ................... H04W 4/027
455/456.1

* cited by examiner

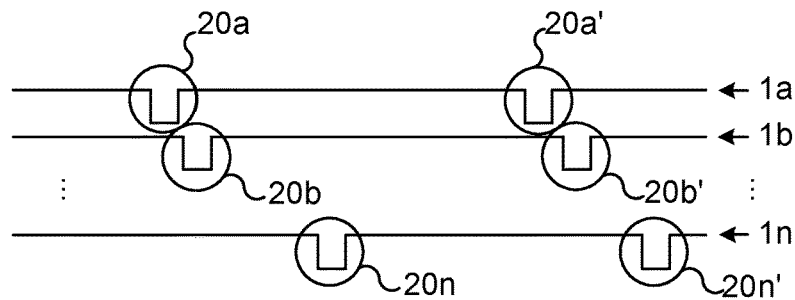
Fig. 4
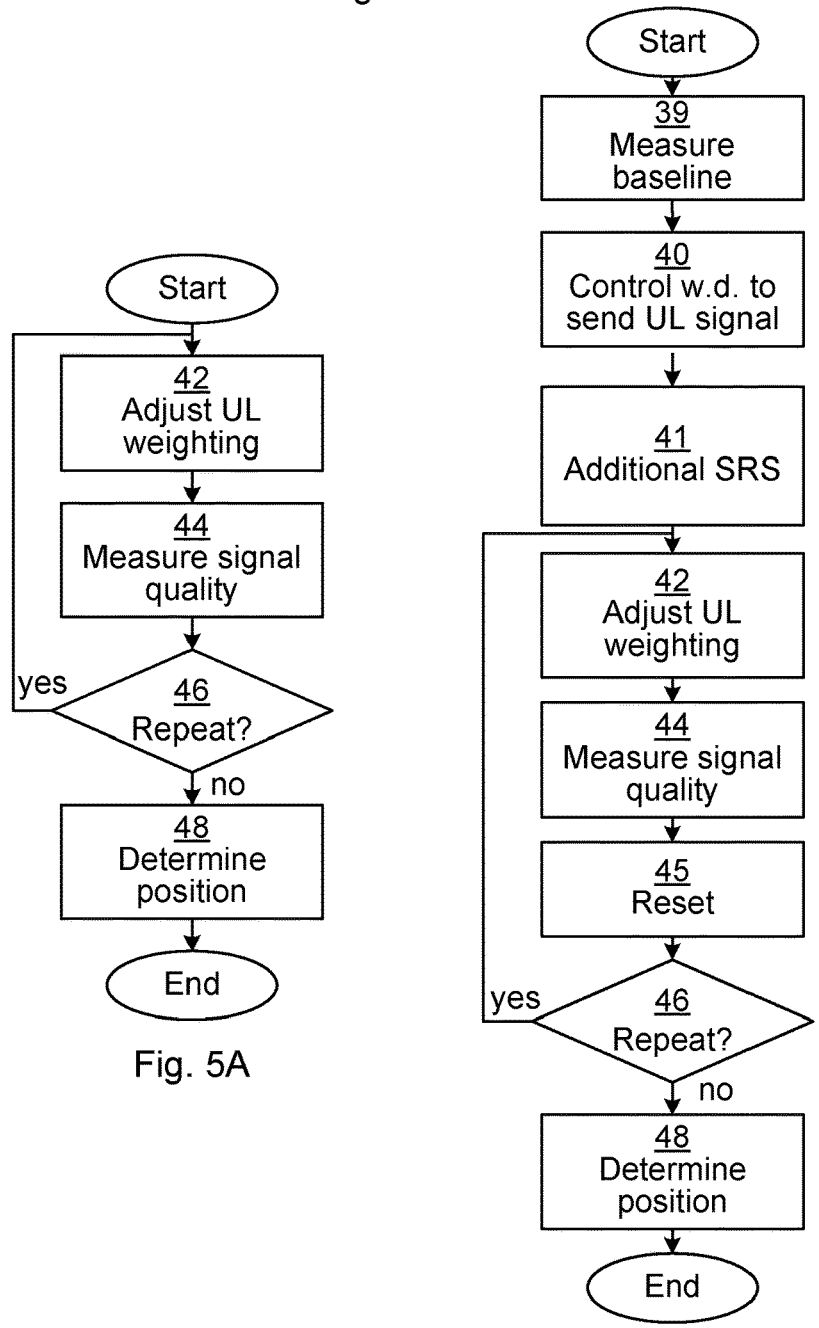
Fig. 5A
Fig. 5B

DETERMINING POSITION OF A WIRELESS DEVICE USING REMOTE RADIO HEADS AND SIGNAL QUALITIES

This application is a 371 of PCT/SE2015/050755, filed Jun. 28, 2015, the disclosure of which is fully incorporated herein by reference.

TECHNICAL FIELD

The invention relates to a method, network node, computer program, and computer program product for determining a position of a wireless device using remote radio heads.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers.

However, since a single cell is spanned by multiple remote radio heads, the granularity of location determination is quite large. This leads to insufficient positioning accuracy in locating wireless devices, leading to issues in complying with increased accuracy of positioning requirements for emergency calls such as those specified in Enhanced-911 (E911) by FCC CSRIC (Federal Communication Commission Communication, Security, Reliability, Interoperability Council). Positioning is also beneficial for other types of services, such as for targeted location based messaging. Since the remote radio heads are often deployed indoors, satellite based positioning such as GPS (Global Positioning System) is often unavailable.

SUMMARY

It is an object to enable better position determination of wireless devices when using a plurality of remote radio heads.

According to a first aspect, it is provided a method for determining a position of a wireless device, the method being performed in a network node connected to a plurality of remote radio heads via a combiner. The method comprises the steps of: adjusting a weighting of an uplink signal for at least one of the remote radio heads; measuring a signal quality of a combined uplink signal received via the combiner; repeating the steps of adjusting and measuring until an exit condition is true; and determining a position of the wireless device based on how the measured signal quality differs for adjustments of weighting of the uplink signal for different remote radio heads.

The step of determining may comprise determining the position of the wireless device to be in the vicinity of a remote radio head for which the measured signal quality was most affected by the adjusting of weighting.

The method may further comprise the step of: controlling the wireless device to send an uplink signal.

The step of controlling may comprise granting an uplink radio resource for the wireless device.

The method may further comprise the step, prior to the step of adjusting, of: measuring a baseline signal quality. In such a case, the step of determining comprises determining how much remote radio heads are affected by comparing the baseline signal quality with the measured signal qualities.

The step of measuring may comprise measuring signal quality of a sounding reference signal.

The method may further comprise the step of: controlling the wireless device to send an additional sounding reference signal.

The exit condition may comprise that a contribution effect of each remote radio head of an uplink signal from the wireless device is derivable from the measured signal qualities.

The step of determining may comprise averaging measurements for corresponding adjustments of uplink signal weightings.

The step of adjusting may comprise muting the uplink signal for one or more of the remote radio heads.

The step of adjusting may comprise adjusting the weighting of the uplink signal on only a strict subset of a plurality of branches intended for multiple input multiple output, MIMO, reception or reception diversity.

The step of adjusting may comprise adjusting the weighting of the uplink signal for one remote radio head at a time.

The method may further comprise the step, after the step of measuring signal quality, of: resetting the weighting of the uplink signal to a normal operational state. In such a case, the step of repeating comprises repeating the step of resetting.

The step of determining a position may comprise determining a position of the wireless device to be between two of the plurality of remote radio heads based on a combination of how the measured signal quality is affected for a plurality of remote radio heads.

According to a second aspect, it is provided a network node for determining a position of a wireless device. The network node comprises: a processor; and a memory storing instructions that, when executed by the processor, cause the network node to: adjust, when the network node is connected to a plurality of remote radio heads via a combiner, a weighting of an uplink signal for at least one of the remote radio heads; measure a signal quality of a combined uplink signal received via the combiner; repeat the instructions to adjust and measure until an exit condition is true; and determine a position of the wireless device based on how the measured signal quality differs for adjustments of weighting of the uplink signal for different remote radio heads.

The instructions to determine may comprise instructions that, when executed by the processor, cause the network node to determine the position of the wireless device to be in the vicinity of a remote radio head for which the measured signal quality was most affected by the adjusting of weighting, as indicating by the measured signal quality.

The network node may further comprise instructions that, when executed by the processor, cause the network node to: control the wireless device to send an uplink signal.

The instructions to control may comprise instructions that, when executed by the processor, cause the network node to grant an uplink radio resource for the wireless device.

The network node may further comprise instructions that, when executed by the processor, cause the network node to: measure a baseline signal quality. In such a case, the instructions to determine comprise instructions that, when executed by the processor, cause the network node to determine how much remote radio heads are affected by comparing the baseline signal quality with the measured signal qualities.

The instructions to measure may comprise instructions that, when executed by the processor, cause the network node to measure signal quality of a sounding reference signal.

The network node may further comprise instructions that, when executed by the processor, cause the network node to: control the wireless device to send an additional sounding reference signal.

The exit condition may comprise that a contribution effect of each remote radio head of an uplink signal from the wireless device is derivable from the measured signal qualities.

The instructions to determine may comprise instructions that, when executed by the processor, cause the network node to average measurements for corresponding adjustments of uplink signal weightings.

The instructions to adjust may comprise instructions that, when executed by the processor, cause the network node to mute the uplink signal for one or more of the remote radio heads.

The instructions to adjust may comprise instructions that, when executed by the processor, cause the network node to adjust the weighting of the uplink signal on only a strict subset of a plurality of branches intended for multiple input multiple output, MIMO, reception or reception diversity.

The instructions to adjust may comprise instructions that, when executed by the processor, cause the network node to adjust the weighting of the uplink signal for one remote radio head at a time.

The network node may further comprise instructions that, when executed by the processor, cause the network node to reset the weighting of the uplink signal to a normal operational state. In such a case, the instructions to repeat comprise instructions that, when executed by the processor, cause the network node to repeat the instructions to reset.

The instructions to determine a position may comprise instructions that, when executed by the processor, cause the network node to determine a position of the wireless device to be between two of the plurality of remote radio heads based on a combination of how the measures signal quality is affected by for a plurality of remote radio heads as indicating by the measured signal qualities.

According to a third aspect, it is provided a network node comprising: means for adjusting, when the network node is connected to a plurality of remote radio heads via a combiner, a weighting of an uplink signal for at least one of the remote radio heads; means for measuring a signal quality of a combined uplink signal received via the combiner; means for repeating the steps of adjusting and measuring until an exit condition is true; and means for determining a position of the wireless device based on how the measured signal quality differs for adjustments of weighting of the uplink signal for different remote radio heads.

According to a fourth aspect, it is provided a computer program for determining a position of a wireless device. The computer program comprises computer program code which, when run on a network node connected to a plurality of remote radio heads via a combiner cause the network node to: adjust a weighting of an uplink signal for at least one of the remote radio heads; measure a signal quality of a combined uplink signal received via the combiner; repeat the adjusting and measuring until an exit condition is true; and determine a position of the wireless device based on how the measured signal quality differs for adjustments of weighting of the uplink signal for different remote radio heads.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 is a schematic diagram illustrating how muting of signals from remote radio heads can be performed to determine position of a wireless device;

FIGS. 5A-B are flow charts illustrating embodiments of methods performed in a network node of FIG. 1 for determining of a position of a wireless device;

DETAILED DESCRIPTION

Figure 1A:
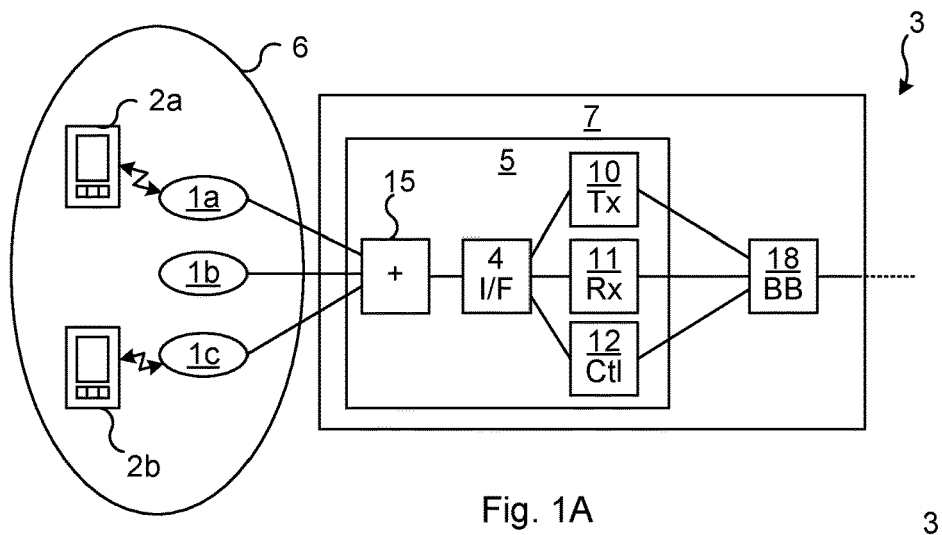
FIGS. 1A-D are schematic architecture diagrams illustrating environments where embodiments presented herein can be applied.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIGS. 1A-D are schematic architecture diagrams illustrating a wireless communication networks 3 being environments where embodiments presented herein can be applied. Considering first FIG. 1A, the wireless communication network 3 comprises a number of remote radio heads 1a-c for installation in locations where traditional deployment with antennas being co-located with the radio base stations is not ideal. For example, the wireless communication network 3 can be installed in an indoor environment, such as in an office, shopping centre, train station or airport.

It is to be noted that, while the embodiments presented herein are described as implemented using LTE (Long Term Evolution), any applicable communication standard may be used, such as any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband module 18 and an intermediate radio unit (IRU) 5, also known as indoor radio unit even though the IRU 5 can also be deployed outside. The IRU 5 is in turn connected to, and is a link for, a number (in this example three) remote radio heads 1a-c via respective cables. In this way, the radio base station 7 is a link for uplink and downlink communication for the remote radio heads connected to the IRU.

The remote radio heads 1a-c connected to the IRU 5 are part of a single cell 6 and thus share a cell identifier. Antennas do not need to be included in this embodiment of the radio base station 7 or the IRU 5, as the remote radio heads 1a-c provide the antennas for the wireless link to one or more wireless devices 2a-b. The wireless link provided by the remote radio heads 1a-c includes both downlink (DL) communication to the wireless devices 2a-b and uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the IRU 5 and the remote radio heads 1a-c.

For uplink communication, the remote radio heads 1a-c downconvert a received (uplink) signal to IF and send it over its cable to the IRU 5. In this embodiment, the received IF signals are combined in a combiner 15 and fed to an interface circuitry 4. The interface circuitry 4 extracts the received IF signal from the interface and forwards it to the RX (reception) back-end 11. In one embodiment, the RX backend 11 comprises an analogue to digital (A/D) converter which samples the signal on IF and converts to a digital signal. In another embodiment, the RX back-end 11 first downconverts the received signals from IF to an analogue BB (baseband) signal which is further filtered and converter to a digital signal in an analogue to digital converter. The RX back-end 11 sends the combined received signals in digital form to the baseband module 18 for further processing such as demodulation, decoding, etc. as known in the art per se.

Optionally, the remote radio heads 1a-c are also powered over the respective cables.

For downlink communication, the process works in reverse to the uplink. Hence, the baseband module 18 sends a digital BB signal for transmission to a TX (transmission) back-end 10 of the IRU 5. In one embodiment, the TX back-end 10 converts the digital BB signal to an analogue signal in IF directly in a digital to analogue (D/A) converter. In another embodiment, the TX back-end 10 pulse first shapes the digital BB signal to an analogue transmission signal and upconverts the transmission signal to IF in the analogue domain. The transmission signal in IF is then inserted onto the interface by the interface circuitry 4, and provided to the combiner 15 which also functions as a splitter, providing the same transmission signal in IF to all connected remote radio heads 1a-c over the respective cables. The remote radio heads 1a-c then upconvert the IF signal to RF and transmit the RF signal over the air to the wireless devices 2a-b.

It is to be noted that the processing of uplink and downlink signals in the IRU and the remote radio heads 1a-c do not need to occur in the digital domain and can be (but do not need to be) performed completely in the analogue domain.

The remote radio heads 1a-c convert from IF to RF for downlink transmission and from RF to IF for uplink reception. Conversely, the IRU converts from digital BB to IF for downlink transmission and from IF to digital BB for uplink reception.

By using IF over the cables instead of RF, cheaper, widely deployed electrical cables can be used, such as Ethernet LAN cabling. In this way, existing indoor cabling can many times be reused during installation, which significantly saves cost and installation time.

Moreover, there is a control link between a processor 12 in the IRU 5 and each remote radio head 1a-c. This control link can be used e.g. to mute an uplink signal, to weight an uplink signal (attenuate/amplify), set the RF frequency used for downconversion and upconversion in the remote radio heads 1a-c, etc.

The transmission and reception is under the control of the MAC (Media Access Control) scheduler in the baseband module 18. The MAC scheduler informs what transmissions should be made and informs, via grants on the downlink signaling, the wireless devices when to transmit and on which frequency and power.

It is to be noted that, although FIG. 1A shows the baseband module 18 connected to one IRU 5, each baseband module 18 can be connected to several IRUs. Each IRU may have its own cell or several IRUs may share a single cell.

It is to be noted that while the embodiment of FIG. 1A shows three remote radio heads 1a-c, there may be fewer or more remote radio heads connected to each IRU 5.

As is explained in more detail below, the position of one or more of the wireless devices 2a-b is determined here by adjusting weightings for a subset of the remote radio heads 1a-c in the uplink and observing effects on the combined uplink signal. In the embodiment shown in FIG. 1A, the position determination can be performed by the radio base station 7 or the IRU 5.

Figure 1B:
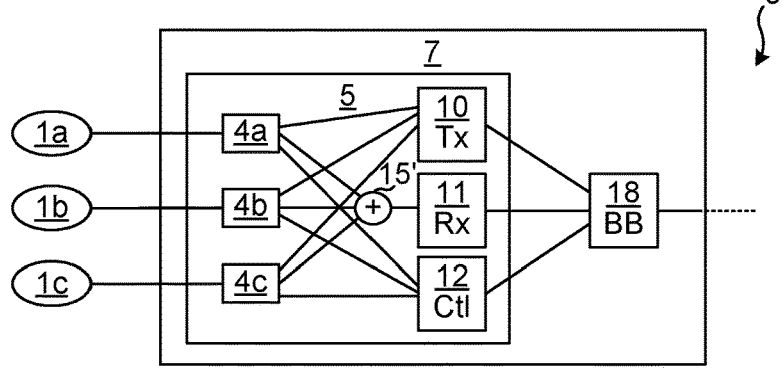

The embodiment shown in FIG. 1B is similar to the embodiment of FIG. 1A, and only differences to the embodiment of FIG. 1A will be described. In this embodiment, there are several instances of interface circuitry 4a-c, one for each remote radio head. Transmission signals are sent in IF from the transmission back-end 10 to each one of the instances of interface circuitry 4a-c, either directly or via a splitter (not shown). Analogously, control signals are sent between the processor 12 and each one of the interface circuitry 4a-c, either directly or via a splitter (not shown). Received signals are sent in IF from the respective interface circuitry 4a-c to a combiner 15' which may here be a pure combiner without splitting functionality.

Each interface circuitry 4a-c is optionally controllable by the controller to mute or otherwise weight (attenuate/amplify) an uplinks signal from a connected remote radio head.

Figure 1C:
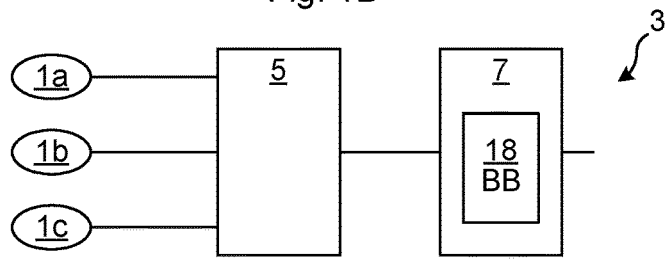

FIG. 1C is a schematic architecture diagram illustrating an alternative embodiment in terms of IRU and radio base station. Here, the IRU 5 is separate, but connected to, the radio base station 7. The IRU 5 itself can be implemented e.g. as shown in FIG. 1A or FIB. 1B.

Figure 1D:
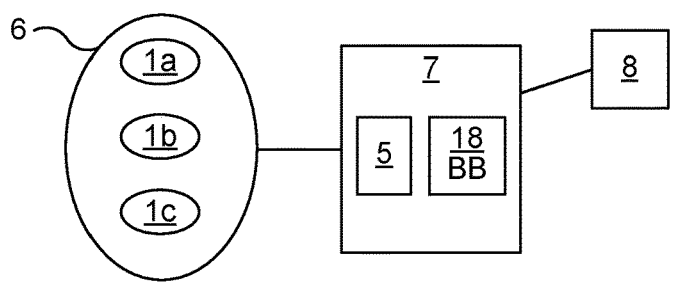

FIG. 1D is a schematic architecture diagram illustrating an environment where position determination is performed in a position determination node 8 which is a network node which is separate from the radio base station 7 and the IRU 5. The position determination node 8 can be local to the radio base station 7 and the IRU 5, e.g. at the same site, or it can be remote to the radio base station 7 and the IRU 5, e.g. at a central location, e.g. as part of a core network or anywhere else with a connection to the radio base station 7. The position determination node 8 can then determine the position of one or more wireless devices 2a-b based on weighting adjustments made prior to uplink signals reaching the radio base station 7 and measurements which can be performed by the radio base station 7.

Figure 2:
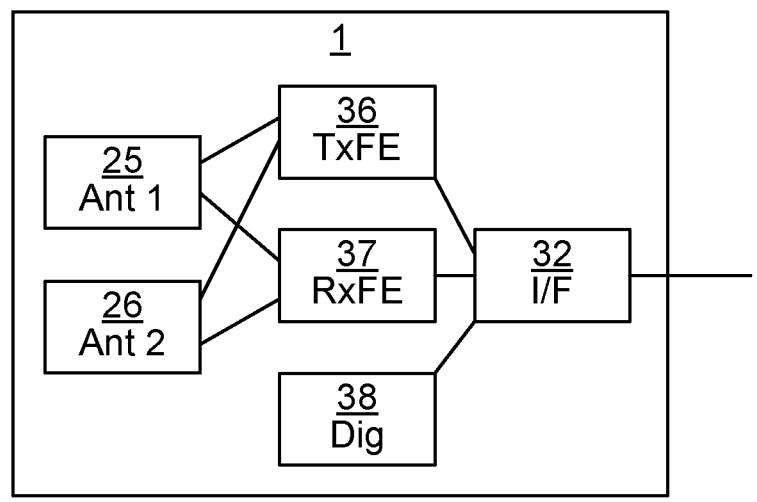
FIG. 2 is a schematic architecture diagram illustrating components of an embodiment of a remote radio head of FIGS. 1A-D.

FIG. 2 is a schematic architecture diagram illustrating components of an embodiment of a remote radio head of FIGS. 1A-D, here represented by a single remote radio head 1. The remote radio head comprises an interface circuitry 32, a transmission front-end 36, a reception front-end 37, a digital unit 38, a first antenna device 25 and a second antenna device 26. It is to be noted that there may be more than two antennas, such as four, six, eight, etc. Furthermore, there may also be only one antenna.

In line with what is explained above, the RX Front End 37 downconverts received signals in RF to IF for transfer over the cable to the IRU 5. Moreover, the TX Front End 36 upconverts transmission signals from IF, as received over the cable from the IRU 5 to RF for transmission to wireless devices.

The first antenna device 25 and second antenna device 26 may be provided with separate streams for MIMO (Multiple Input Multiple Output) transmission and/or reception. Hence, e.g. for transmissions, the baseband module can provide a first MIMO stream for transmission on the first antenna device 25 and a second MIMO stream for transmission on the second antenna device 26. Each one of the first and second antenna devices 25, 26 may comprise one or more antenna elements. Particularly, each antenna device 25, 26 can comprise one or more antenna elements in a first polarisation and one or more antenna elements in a second polarisation to achieve an additional dimension of orthogonality. The two polarisations may be controlled separately.

The antenna devices 25, 26 may also comprise appropriate filters to filter out unwanted signals.

It is to be noted that while the remote radio head 1 is here shown comprising two antenna devices, there may be more antenna devices, e.g. four, eight, sixteen, etc.

The interface circuitry 32 inserts and extracts (multiplexes and demultiplexes) the transmission IF signal, the received IF signal and the control signal onto/from the cable. The interface circuitry 32 may use different frequency bands for uplink signals, downlink signals and control signals to thereby multiplex all of these on a single cable. Alternatively, separate cable can be used for one or more of uplink signals, downlink signals and control signals.

A digital unit 38 communicates with the processor 12 of the IRU. For example, the digital unit 38 may be used to receive commands from the processor 12 to mute or otherwise weight (e.g. attenuate or amplify) an uplink signal in the RX Front End 37. The digital unit 38 can be implemented using software instructions such as a computer program executed by a processor and/or using only hardware, such as application specific integrated circuits, field programmable gate arrays, discrete logical components, etc.

Optionally, the remote radio head is connected to the radio base station via digital transmissions (not shown). In such a case, the remote radio head performs analogue to digital conversion, and vice versa, as well as downconversion/upconversion of the analogue signals from/to RF for reception and transmission from/to the wireless devices. The digital signal between IRU and radio head may be CPRI signal or a signal over Gigabit Ethernet. In this case, the radio head performs the conversion between CPRI signal or the Gigabit Ethernet signal and the RF signal.

Figure 3:
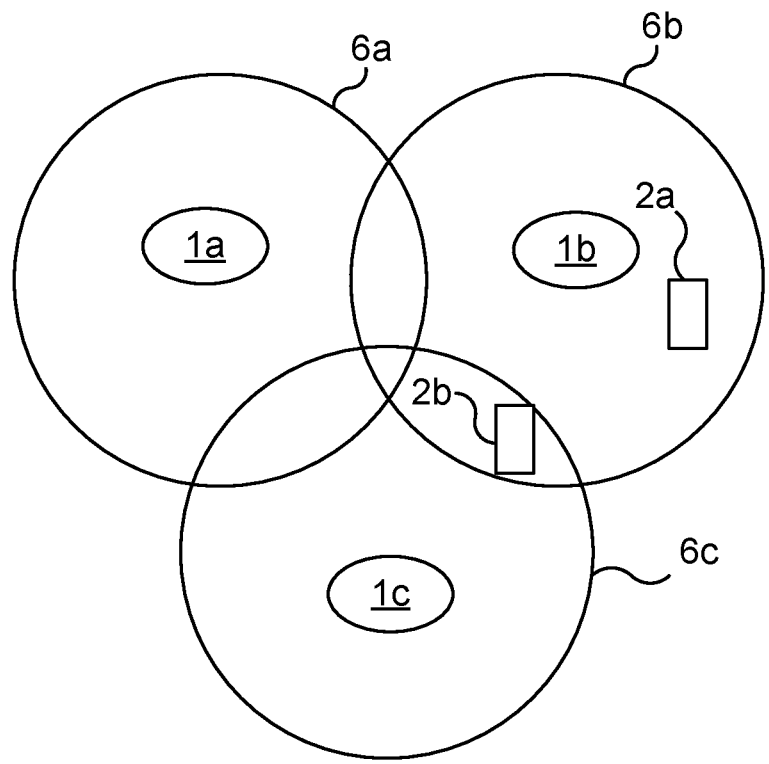
FIG. 3 is a schematic topological diagram illustrating cell coverage of the three remote radio heads of FIGS. 1A-D according to one embodiment.

FIG. 3 is a schematic topological diagram illustrating cell coverage of the three remote radio heads 1a-c of FIGS. 1A-D according to one embodiment. The first radio head 1a provides coverage in a first coverage area 6a. The second radio head 1b provides coverage in a second coverage area 6b. The third radio head 1c provides coverage in a third coverage area 6c. There is here some overlap between the coverage areas. All three coverage areas 6a-c relate to a single cell.

A first wireless device 2a is located in the second coverage area 6b. A second wireless device 2b is located in a position which is both within the second coverage area 6b and the third coverage area 6c.

As is shown below, the position of each one wireless device 2a-b can be estimated by modifying a weighting for the uplink signals from each one of the remote radio heads 1a-c.

FIG. 4 is a schematic diagram illustrating how muting of signals from remote radio heads can be performed to determine position of a wireless device. The example shown in FIG. 4 is one way in which the methods below can be embodied and is used as an illustration.

Here, each line represents weighting of an uplink signal for a respective remote radio head. There is a line for the weighting of the first remote radio head 1a, a line for the weighting of the second remote radio head 1a, etc. until a line for the weighting of an n:th remote radio head 1n. As explained above, the uplink signals for all the remote radio heads are combined in the IRU (not shown here).

A weighting of the uplink signal is adjusted by successively muting the uplink signal from one remote radio head at a time in a round robin fashion. Hence, there is a first muting 20a of the first remote radio head, a first muting 20b of the second remote radio head, etc., until a first muting 20n of the n:th remote radio head is performed. For each muting, the signal quality for the combined signal is measured.

The position of the wireless device is then determined based on how the measured signal quality differs for the adjustments of weighting of the uplink signal for different remote radio heads. For instance, if the wireless device is right by the second remote radio head 20b, then the combined uplink signal is affected the most when the second remote radio head 1b is muted, e.g. by a significant reduction in signal quality.

The procedure can be repeated a second time for second mutings 20a', 20b', . . . , 20n', after which an averaging can be performed to reduce the effect of temporary signal variations.

The principle illustrated in FIG. 4 will now be generalised and described with reference to FIGS. 5A-B. FIGS. 5A-B are flow charts illustrating methods performed in a network node of FIG. 1 for determining a position of a wireless device. The network node can be the radio base station 7 or the IRU 5 of FIGS. 1A-D. Alternatively, the network node can be the position determination node 8 of FIG. 1D. In any case, the network node is able to adjust and obtains signal quality (either by itself or by commanding another node) for a plurality of remote radio heads. The method can e.g. be started when a request for a position of a specific wireless device is received by the network node, e.g. due to an emergency call from a particular wireless device. The method can be performed in parallel for several wireless devices if needed.

In an adjust UL weighting step 42, a weighting of an uplink signal is adjusted for at least one of the remote radio heads. In one embodiment, the weighting is adjusted by muting the uplink signal for one or more of the remote radio heads. In such a case, the muting can be implemented by a switch, either by or in the IRU, in the remote radio head or somewhere in between. The weighting can also be adjusted by attenuating or amplifying the uplink signal for one or more of the remote radio heads. Alternatively or additionally, an interference (e.g. noise) is added to the uplink signal from one or more of the remote radio heads.

The weighting of the uplink signal can be applied to only a strict subset of a plurality of branches intended for MIMO reception or reception diversity. For instance, if there are two MIMO branches, the weighting could be applied to only one MIMO branch, whereby the other MIMO branch is unaffected.

In one embodiment, the weighting of the uplink signal is adjusted for one remote radio head at a time.

In one embodiment, the weighting of the uplink signal is performed according to a predefined signature. Each signature then comprises a series of weightings. If, for all the remote radio heads, the signatures are orthogonal, the signatures can be applied concurrently.

In a measure signal quality step 44, a signal quality of a combined uplink signal received via the IRU is measured.

In one embodiment, this involves measuring signal quality of a sounding reference signal (SRS) or channel quality indicator (CQI). Alternatively or additionally, the signal quality of uplink data can be measured.

For instance, the signal quality can be measured using SIR (Signal to Interference Ratio) or SINR (Signal to Noise and Interference Ratio).

In a conditional repeat step 46, it is determined whether an exit condition is true. If the exit condition is not true, a repeat is performed by returning to the adjust uplink weighting step 42. Otherwise, the method proceeds to a determine position step.

The exit condition can e.g. comprise that a contribution effect of each remote radio head of an uplink signal from the wireless device is derivable from the measured signal qualities. In one embodiment, when a round robin scheme is employed to adjust signal for one remote radio head at a time, the exit condition can be that all remote radio heads have been adjusted a predetermined number of times (e.g. one time each, or more).

In a determine position step 48, a position of the wireless device is determined based on how the measured signal quality differs for adjustments of weighting of the uplink signal for different remote radio heads.

For instance, the position of the wireless device can be determined to be in the vicinity of a remote radio head for which the measured signal quality was most affected by the adjusting of weighting.

Optionally, measurements for corresponding adjustments of uplink signal weightings are averaged. It takes longer to collect sufficient data when averaging is employed, but the position determination is then less susceptible to temporary signal quality variations, thus improving accuracy. This is particularly the case in indoor environments where slow fading occurs. In a licensed band, interference from other sources (i.e. other wireless devices) would also display the same slow fading behaviour and would not cause confusion in the interpretation of the weighting adjustment. However, system noise with short correlation times, and transient interference from unexpected sources (when operating in an unlicensed band) could cause rapid fluctuations in the total (signal+interference) received signal level. To guard against such issues impacting the interpretation of the muting action, averaging may be performed for longer periods of time and/or the received uplink signal target power can be increased. The amount of averaging or power adjustment required is then configurable to reflect each operational environment.

It is also possible to determine the position of the wireless device to be between two of the plurality of remote radio heads based on a combination of how the measured signal quality is affected for a plurality of remote radio heads. This can e.g. be used for the second wireless device 2b shown in FIG. 3. For instance, for the second wireless device 2b, both the second and the third remote radio heads 1b, 1c are affected equally when adjusted in weighting in the uplink. Other effects, such as fading, etc., might offset the balance slightly, but in any case the second and third remote radio heads 1b, 1c are affected the most. This principle can be expanded to more than two remote radio heads for greater accuracy.

One challenge that may occur, particularly with indoor systems, is the presence of a wireless device near, or within the coverage region of the shared cell of interest, but actually connected to a different cell. Such a case can happen, for example, when a wireless device is near a window. In such a situation the wireless device connected to the different cell can be transmitting a very strong uplink signal that can reduce the sensitivity to the power modulation methods described here. One way to handle such an occurrence is to first identify the presence of a strongly interfering wireless device, then avoid using data corrupted by the wireless device signal. Identification of such an interfering wireless device signals can be done by evaluating the signal for a high uplink power (i.e. the interfering wireless device is not power controlled by this scheduler) or a sudden change in average power at a cell boundary.

FIG. 5B is a flow chart illustrating a method similar to the method illustrated in FIG. 5A. Only new steps or steps which are modified compared to the method illustrated in FIG. 5A will be described below.

In an optional measure baseline step 39, a baseline signal quality is measured. When this step is performed, the determine position step 48 comprises determining how much remote radio heads are affected by comparing the baseline signal quality with the measured signal qualities. The baseline signal quality can e.g. be measured based on a reference signal when the weighting is not adjusted.

In an optional control wireless device to send UL signal step 40, the wireless device is controlled to send an uplink signal. This can e.g. comprise granting an uplink radio resource for the wireless device. The granting can be performed by the network node itself when it is a radio base station, otherwise, the network node signals the appropriate radio base station to grant the uplink transmission. The uplink grants can be performed every subframe if needed. Even though the wireless device does not have data to send, it will transmit padding data on a shared uplink channel such as PUSCH (Physical Uplink Shared Channel) according to the grants.

Using uplink grants, detection is fast since the reporting period on e.g. Physical Uplink Control Channel (PUCCH) can not be shorter than a certain limit. Moreover, using uplink grants, changes to the PUCCH configuration manager is avoided. This option involves a slight capacity cost for scheduling a wireless device to transmit every subframe, but on a network level the reduced capacity is proportional to how often positioning is used, so if the positioning is not used all the time, the actual capacity cost increase can be minimal.

In one embodiment, the network node ensures that other wireless devices are not scheduled for uplink transmission in the subframe when the weighting is adjusted.

The evolution of wireless standards has moved towards the use of uplink signal structures that employ short time-based segments of data. In particular, the OFDM (Orthogonal Frequency Division Multiplex) based methods of WiFi, LTE, and proposed 5G standards use such a structure, where the shortest time segment is a symbol. For air interfaces that use such type of uplink signal structure, it can be advantageous to make the time duration for the adjustment of weighting comparable to these short time durations. In such a situation, the short weighting adjustment action is clearly detectable as the signal receive power is significantly reduced. However, the high level impact on decoded signal integrity is marginal as the main portion of the signal (integrated over several time segments) remains intact.

In an optional additional SRS step 41, the wireless device is controlled to send additional sounding reference signal.

In an optional reset step 45, the weighting of the uplink signal is reset to a normal operational state. In this way, each adjustment of weighting can be applied only for a short time, e.g. 0.07-20 ms.

One example of an application of the presented methods in the context of LTE will now be described. In this example, the weighting adjustment is muting.

When muting is performed on the uplink receive branch of one of the remote radio heads in the shared cell, a data symbol (PUSCH), or symbols, can be muted out. More than one symbol may be muted, but the muting of one symbol should be sufficient to detect the muting action. Another variant is to specifically mute only one reference symbol in one of the two slots of a subframe.

In LTE, the subframe is divided into two slots of 0.5 ms. Each slot is divided into 7 symbols where the fourth symbol (the middle one) is the reference symbol. Then, muting one remote radio head at a time and comparing the received power between the two reference symbols of the same subframe permits to detect if the muted remote radio head had a significant contribution to the received signal. By comparing symbols in the same subframe, we avoid confusion that could result when two different subframes are compared to each other and where the second subframe, experiencing the muting, is actually not transmitted for instance because the wireless device did not correctly receive the grant.

One option is to mute all remote radio heads but one, enabling even more accurate measurements. A second benefit of muting the reference symbol is that the channel estimate derived from the non-muted reference symbol can be re-used in place of the muted reference symbol. This is possible, in an in-door environment, because the channel's Doppler effect is small (due to slow moving wireless devices, typically indoors) and the channel is almost constant during one slot. This should allow to decode the data symbols with relatively small degradation. This can be further improved by muting only per antenna branch (all remote radio head antennas with same polarization can be mapped to the same branch in the IRU). Thus, muting one branch at a time sequentially and gathering data from both branches allows building up enough significant statistics avoiding the risk of having a deep fade if only one branch were used, and in the same time limiting even further the degradation of decoding the data.

In the presence of muting the normal receive processing of LTE is applied. Specifically, an FFT (Fast Fourier Transform) is performed on the time sequence of data, symbol by symbol. Once the signal is transformed into frequency space, the signals for each scheduled user can be examined separately, since each user is assigned a unique set of tones during the uplink scheduling process. In this way, position estimation may be performed for several users in parallel.

The receive power for each user is calculated by summing the power from all of the user specific tones (resource elements) in the symbol of interest. This summing has the added benefit of reducing the variance in the power level estimate due to noise.

For each user, the net power in the muted symbol (or symbols) is compared with the net power in adjacent non-muted symbols (within the same subframe, or within the same slot if frequency hopping is used). As described earlier, the relative change in the wireless device uplink signal is an indicator of the proximity of the user to the muted remote radio head.

In all other aspects, the full receive processing is performed. The muted data will have no impact to data integrity if the wireless device is not close to the muted remote radio head. If the wireless device is close to the muted remote radio head, the loss of one (or a few) data symbols can be compensated either by setting the MCS (Modulation and Coding Scheme) conservatively, and/or through the normal HARQ (Hybrid Automatic Repeat Request) retransmit process.

Uplink power control is set on the basis uplink receive signal levels. Muted symbols should not be used in calculations related to power control settings.

Since the summing of tones reduces the effect of noise variance on the power estimate, if desired the number of tones scheduled for the wireless device (the selected MCS) can be increased. Similarly, more than one tone can be muted. Finally, to achieve a good assessment of wireless device location, for each remote radio head, several subframes can be examined.

In principle, the muting can be applied anywhere in the receive path. The closer to the receive antenna the muting is applied, the broader the muting impact in terms of number of channels and wireless devices affected. The most severe case is when muting is applied before any separation of wireless devices or channels, in which case all wireless devices and channels in the subframe containing the muted symbol(s) are impacted. The uplink channels include: PUSCH, PUCCH, and RACH (Random Access Channel). However, since the uplink is completely scheduled, there are a number of planned actions that can be taken to actively control the impact of the muting operation.

With respect to PUCCH and RACH, since the control information is encoded across the full subframe, the loss of a symbol can likely be tolerated. (Of course only those wireless devices directly under the muted Rx antenna will see significant loss of signal strength for that symbol.) If desired, to guard against any degradation in PUCCH or RACH capacity, certain subframes can be preselected as candidates that will include a muted symbol. These subframes can be maintained as free of PUCCH users (or RACH opportunities).

For PUSCH, the scheduler control of MCS has already been discussed. As well, the scheduler can actively organise user traffic so that only wireless devices of interest (for location purposes) are transmitting in subframes containing muted symbols. As the muting pattern cycles through the different remote radio heads, the remote radio head revisit period should be made different from the HARQ period.

Figure 6:
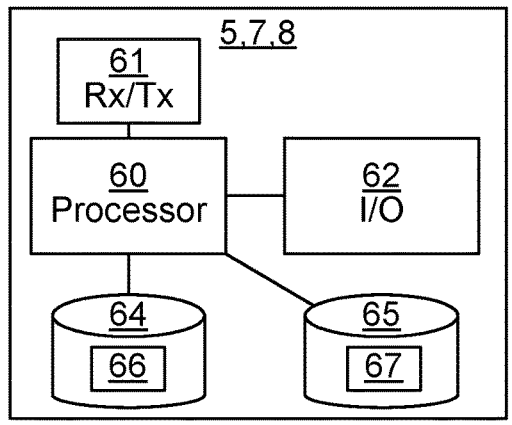
FIG. 6 is a schematic diagram showing some components of an embodiment of a network node being the radio base station or IRU of FIGS. 1A-D.

FIG. 6 is a schematic diagram showing some components of a network node being the IRU 5 or the radio base station 7 of FIGS. 1A-D. Alternatively, the network node is the position determination node 8 of FIG. 1D. It is to be noted that the network node does not need to be (but can be) implemented as one device and can be distributed over several devices connected locally or remotely.

A processor 60 is provided using any combination of one or more of a suitable central processing unit (CPU), multiprocessor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 5A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store measurement reports received from wireless devices to be used for positioning of the wireless device as described above.

The network node further comprises an I/O interface 62 for communicating with a core network and optionally with (other) radio base stations.

The network node may also comprise one or more transceivers 61, comprising analogue and digital components for radio communication with wireless devices within one or more radio cells, e.g. using remote radio heads as described above Other components of the network node are omitted in order not to obscure the concepts presented herein.

Figure 7:
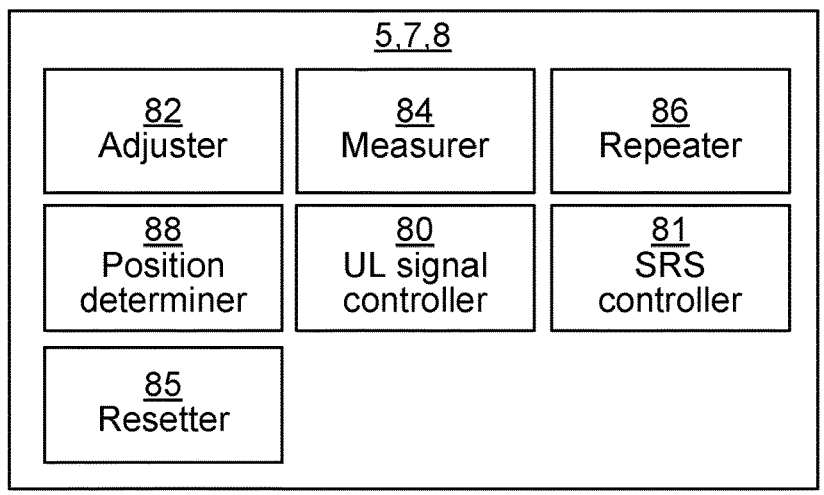
FIG. 7 is a schematic diagram showing functional modules of the software instructions of the network node of FIG. 6 according to one embodiment.

FIG. 7 is a schematic diagram showing functional modules of the software instructions 66 of the network node, being the IRU 5, the radio base station 7 or the position determination node 8, of FIG. 6 according to one embodiment. The modules are implemented using software instructions such as a computer program executing in the network node. The modules correspond to the steps in the methods illustrated in FIGS. 5A-B.

An adjuster 82 corresponds to step 42. A measurer 44 corresponds to steps 39 and 44. A repeater 86 corresponds to step 46. A position determiner 88 corresponds to step 48. An UL signal controller 80 corresponds to step 40. An SRS controller 81 corresponds to step 41. A resetter 85 corresponds to step 45.

Figure 8:
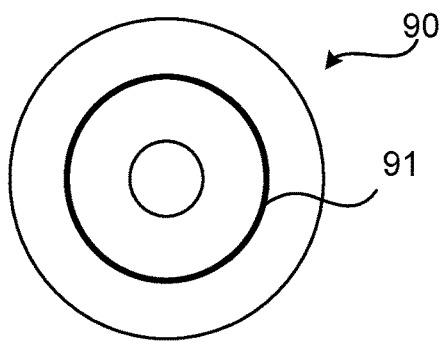
FIG. 8 shows one example of a computer program product comprising computer readable means.

FIG. 8 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining a position of a wireless device, the method being performed in a network node connected to a plurality of remote radio heads via a combiner, the method comprising the steps of:
adjusting a weighting of an uplink signal for at least one of the remote radio heads;
measuring a signal quality of a combined uplink signal received via the combiner;
repeating the steps of adjusting and measuring until an exit condition is true; and
determining a position of the wireless device based on how the measured signal quality differs for adjustments of weighting of the uplink signal for different remote radio heads.

2. The method according to claim 1, wherein the step of determining comprises determining the position of the wireless device to be in the vicinity of a remote radio head for which the measured signal quality was most affected by the adjusting of weighting.

3. The method according to claim 1, further comprising the step of:
controlling the wireless device to send an uplink signal.

4. The method according to claim 3, wherein the step of controlling comprises granting an uplink radio resource for the wireless device.

5. The method according to claim 4, further comprising the step of:
controlling the wireless device to send an additional sounding reference signal.

6. The method according to claim 1, further comprising the step, prior to the step of adjusting, of:
measuring a baseline signal quality;
and wherein the step of determining, comprises determining how much remote radio heads are affected by comparing the baseline signal quality with the measured signal qualities.

7. The method according to claim 1, wherein the step of measuring comprises measuring signal quality of a sounding reference signal.

8. The method according to claim 1, wherein the exit condition comprises that a contribution effect of each remote radio head of an uplink signal from the wireless device is derivable from the measured signal qualities.

9. The method according to claim 1, wherein the step of determining comprises averaging measurements for corresponding adjustments of uplink signal weightings.

10. The method according to claim 1, wherein the step of adjusting comprises muting the uplink signal for one or more of the remote radio heads.

11. The method according to claim 1 wherein the step of adjusting comprises adjusting the weighting of the uplink signal on only a strict subset of a plurality of branches intended for multiple input multiple output, MIMO, reception or reception diversity.

12. The method according to claim 1, wherein the step of adjusting comprises adjusting the weighting of the uplink signal for one remote radio head at a time.

13. The method according to claim 1, further comprising the step, after the step of measuring signal quality, of:
resetting the weighting of the uplink signal to a normal operational state; and
wherein the step of repeating comprises repeating the step of resetting.

14. The method according to claim 1, wherein the step of determining a position comprises determining a position of the wireless device to be between two of the plurality of remote radio heads based on a combination of how the measured signal quality is affected for a plurality of remote radio heads.

15. A network node for determining a position of a wireless device, the network node comprising:
a processor; and
a memory storing instructions that, when executed by the processor, cause the network node to:
adjust, when the network node is connected to a plurality of remote radio heads via a combiner, a weighting of an uplink signal for at least one of the remote radio heads;
measure a signal quality of a combined uplink signal received via the combiner;
repeat the instructions to adjust and measure until an exit condition is true; and
determine a position of the wireless device based on how the measured signal quality differs for adjustments of weighting of the uplink signal for different remote radio heads.

16. The network node according to claim 15, wherein the instructions to determine comprise instructions that, when executed by the processor, cause the network node to determine the position of the wireless device to be in the vicinity of a remote radio head for which the measured signal quality was most affected by the adjusting of weighting, as indicating by the measured signal quality.

17. The network node according to claim 15, further comprising instructions that, when executed by the processor, cause the network node to: control the wireless device to send an uplink signal.

18. The network node according to claim 17, wherein the instructions to control comprise instructions that, when executed by the processor, cause the network node to grant an uplink radio resource for the wireless device.

19. The network node according to claim 15, further comprising instructions that, when executed by the processor, cause the network node to: measure a baseline signal quality;
and wherein the instructions to determine, comprise instructions that, when executed by the processor, cause the network node to determine how much remote radio heads are affected by comparing the baseline signal quality with the measured signal qualities.

20. The network node according to claim 15, wherein the instructions to measure comprise instructions that, when executed by the processor, cause the network node to measure signal quality of a sounding reference signal.

* * * * *

UNITED STATES PATENT AND TRADEMARK OFFICE
CERTIFICATE OF CORRECTION

PATENT NO. : 10,088,552 B2
APPLICATION NO. : 15/740478
DATED : October 2, 2018
INVENTOR(S) : Skarby et al.

Page 1 of 1

It is certified that error appears in the above-identified patent and that said Letters Patent is hereby corrected as shown below:

In the Specification

In Column 5, Lines 17-18, delete "W-CDMA (Wideband Code Division Multiplex)," and insert -- W-CDMA (Wideband Code Division Multiple Access), --, therefor.

In Column 5, Line 67, delete "backend" and insert -- back-end --, therefor.

In Column 7, Line 25, delete "FIB." and insert -- FIG. --, therefor.

In Column 8, Line 59, delete "1a," and insert -- 1b, --, therefor.

In Column 13, Lines 45-46, delete "read and write memory (RAM)" and insert -- random access memory (RAM) --, therefor.

In Column 13, Lines 51-52, delete "read and write memory (RAM)" and insert -- random access memory (RAM) --, therefor.

In Column 14, Line 11, delete "measurer 44" and insert -- measurer 84 --, therefor.

Signed and Sealed this
Twenty-ninth Day of September, 2020

Andrei Iancu
*Director of the United States Patent and Trademark Office*